Feb. 21, 1950 E. H. SHERBONDY 2,498,011
RADIAL BEARING
Filed Aug. 16, 1946 2 Sheets-Sheet 1

INVENTOR.
EARL H. SHERBONDY
BY Fay Holrick & Fay
ATTORNEYS

Feb. 21, 1950     E. H. SHERBONDY     2,498,011
RADIAL BEARING

Filed Aug. 16, 1946     2 Sheets-Sheet 2

INVENTOR.
EARL H. SHERBONDY
BY *Fay Golrick & Fay*
ATTORNEYS

Patented Feb. 21, 1950

2,498,011

UNITED STATES PATENT OFFICE 2,498,011

RADIAL BEARING

Earl H. Sherbondy, Cleveland, Ohio, assignor to Gridiron Steel Company, Cleveland, Ohio, a corporation of Ohio Application August 16, 1946, Serial No. 690,843

1 Claim. (Cl. 308—73)

This invention relates to bearings and more particularly to radial bearings of the type automatically to create and maintain a high pressure oil film between the bearing and journal surfaces.

Sleeve bearings are subject to uneven wear under the conditions of shaft deflection when running at torque load speeds. The present invention is aimed at the provision of a plurality of movable bearing surfaces which may accommodate such shaft deflection while at the same time induce the formation of films of oil between the shaft and bearings in order to provide minimal conditions of friction and wear.

It is accordingly the object of this invention to provide a highly serviceable plain bearing of economical construction which is readily adaptable to many uses throughout automotive and power transmission industries.

It is a related object to provide a bearing which is self-lubricating and in which the bearing surfaces are readily replaceable when worn or damaged.

Other objects will become apparent hereinafter when the following specification is read in light of the accompanying drawings in which, Fig. 1 is a front elevational view of one embodiment of the invention shown partly in section;

Figures 1, 2:
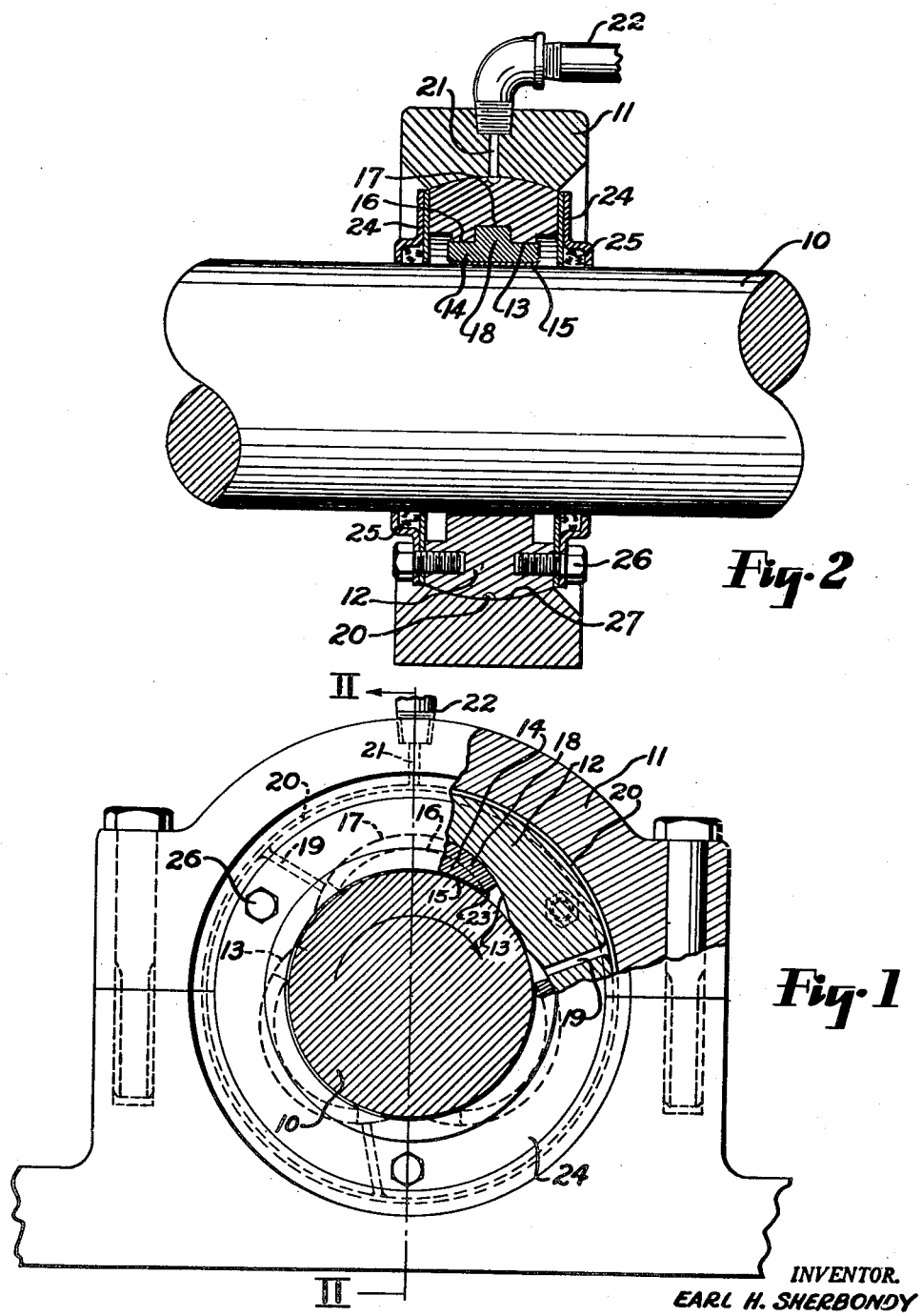
Fig. 2 is a mid-sectional elevational view taken along line II—II of Fig. 1.

Referring now more particularly to the drawings, in which like reference characters refer to like parts throughout: One form of the invention, which is adapted to use in engines or other places where special mountings may be provided, has, for purposes of illustration, been shown as applied to journal a shaft 10 in a pillow block 11. It will be understood, however, that any suitable mounting may be used instead of this pillow block. The bearing is comprised of a cage 12 which has two or more circumferential concavities 13 cut in its inner face. Bearing shoes 14 having a shaft conforming face 15 and a convex surface 16 are adapted for disposition in the concavities 13 of the cage 12. In order to position the shoes 14 against axial displacement the concavities 13 are provided with a groove 17 centrally of their extent extending circumferentially of the shaft. The shoes 14 are in turn provided with lands 18 which are accommodated in the grooves 17 and held in place thereby.

As so constructed, the shoes 14 are adapted to move circumferentially of the shaft an infinitesimal amount and do so in response to the revolution of the shaft and any deflection thereof under load requirements.

The cage is provided with openings 19 which extend from a manifold feed groove 20, centrally of the cage and upon its outer surface, into the concavities 13 upon the approach side of the shoes relative to the direction of revolution of the shaft. Oil is supplied to the concavities through the openings 19 and feed groove 20 by any suitable arrangement similar to an oil line 21 disposed in the head of the pillow block 11 and served by a conduit 22 which may lead to an oil pump or to a gravity supply oil cup (not shown).

Figure 4:
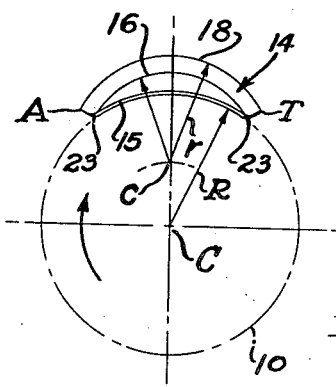
Fig. 4 is a front elevational view of a bearing shoe adapted for use in the cage of Fig. 3. In both Figures 3 and 4 certain geometric relationships between the several parts are illustrated.
Figure 3:
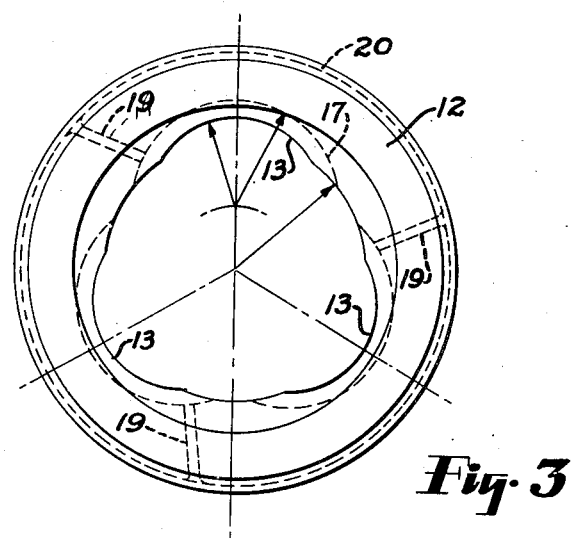
Fig. 3 is a front elevational view of a cage constructed in accordance with the present invention.

As best illustrated in Figs. 3 and 4 the concavities 13 and the conforming portions 16 and 18 of the shoes are arcuate throughout their extent and are scribed from a center $c$ acentric with respect to the shaft center $C$ and on radii $r$ which are less than the shaft radius $R$.

It is obvious that if the radii $r$ were equal to the shaft radius $R$ less than three bearing shoes could be provided within the circumferential extent of the shaft. If $r$ were greater than $R$ the bearing surface 15 would have to be scribed correspondingly from a greater radius and only a line contact with the journal would thus be provided.

Although it is not intended to limit the invention to three shoes as illustrated, since it is contemplated that two or four or a greater number may be adopted, still, it is believed that the optimum condition is nevertheless obtained when three shoes are employed in the manner shown. The revolutionary movement of the shaft 10 tends to cause the trailing sides T, relative to the direction of shaft revolution, to follow it and by virtue of the difference in radii between the shaft and the support of the shoes in the cage this is effective to provide greater clearance between the approach side A of the shoe, relative to the turning of the shaft, and the shaft itself at this point. Although this movement is microscopic in dimension, it is sufficient to entrain a thin film of oil between bearing surface of the shoe and the journal, which builds-up and tends to return the shoe to its truly concentric disposition. During continued turning of the shaft the oil film may become impoverished, causing the microscopic bearing tilting movement, previously referred to, to recur, thus to effect restitution of the high pressure oil film.

It should be noted that the edge of the bearing surfaces of the shoes 14 are chamfered, rounded, or otherwise relieved as at 23 in order to insure proper admission and entrainment of oil between the bearing and the journal surfaces and to preclude shearing the oil film.

For the proper retention of the oil within the cage, side plates 24 are provided to enclose the cage and to conform to the shaft in an oil-tight seal provided by annular packing 25 of any suitable material. The side plates may be retained in position by machine screws 26 or by any other suitable retaining means.

Although a self-aligning bearing has been shown as at 27 between the case and the pillow block, it will be understood that any other preferred mounting may be adopted.

I claim as my invention:

A shaft bearing comprising, a cage having an opening therethrough for receiving a shaft, said cage having a plurality of arcuate concavities about said opening, the centers of the arcs of said concavities lying in the plane of the radius of the shaft to be received in the opening and the radius of said arcs being less than the radius of said shaft, a shoe in each of said concavities, each of said shoes having an arcuate bearing surface adapted to engage the periphery of the shaft and having a convex surface conforming to and engaging the walls of the concavity, said shoes being shorter than the concavities whereby one end of the shoes is spaced from an end of the respective concavities, and an oil supply conduit extending into each of said concavities adjacent said end of the concavity for feeding oil into said space.

EARL H. SHERBONDY.

REFERENCES CITED

The following references are of record in the file of this patent:

UNITED STATES PATENTS

| Number | Name | Date |
|---|---|---|
| 1,161,721 | Parsons | Nov. 23, 1915 |
| 1,882,103 | Wallgren | Oct. 11, 1932 |
| 1,956,973 | Baum | May 1, 1934 |
| 2,003,316 | Schein | June 4, 1935 |
| 2,078,713 | Hudson | Apr. 27, 1937 |

FOREIGN PATENTS

| Number | Country | Date |
|---|---|---|
| 547,306 | Great Britain | Aug. 21, 1942 |
| 189,017 | Great Britain | Nov. 23, 1922 |